(12) United States Patent
Hishikawa et al.

(10) Patent No.: US 7,759,895 B2
(45) Date of Patent: Jul. 20, 2010

(54) NUMERICAL CONTROLLER AND SYNCHRONOUS CONTROL METHOD USING NUMERICAL CONTROLLER

(75) Inventors: Tetsuo Hishikawa, Yamanashi (JP); Noboru Hirose, Yamanashi (JP)

(73) Assignee: Fanuc Ltd, Minamitsuru-gun, Yamanashi (JP)

( * ) Notice: Subject to any disclaimer, the term of this patent is extended or adjusted under 35 U.S.C. 154(b) by 380 days.

(21) Appl. No.: 12/003,733

(22) Filed: Dec. 31, 2007

(65) Prior Publication Data
US 2008/0180051 A1   Jul. 31, 2008

(30) Foreign Application Priority Data
Jan. 5, 2007   (JP) .............................. 2007-000691

(51) Int. Cl.
G05B 19/18   (2006.01)
(52) U.S. Cl. .................. 318/569; 318/568.22; 318/575; 318/600; 318/632
(58) Field of Classification Search .................. 318/569, 318/568.16, 568.18, 568.22, 570, 575, 595, 318/600, 632
See application file for complete search history.

(56) References Cited
U.S. PATENT DOCUMENTS

| | | | | |
|---|---|---|---|---|
| 5,025,200 | A * | 6/1991 | Kurakake et al. | 318/569 |
| 5,059,881 | A * | 10/1991 | Fujita et al. | 318/630 |
| 6,534,944 | B2 * | 3/2003 | Toyozawa et al. | 318/625 |
| 6,903,527 | B2 * | 6/2005 | Toyozawa et al. | 318/568.13 |
| 7,425,811 | B2 * | 9/2008 | Onishi et al. | 318/569 |

| | | |
|---|---|---|
| 2005/0024003 A1 | 2/2005 | Kochiya et al. |

FOREIGN PATENT DOCUMENTS

| | | |
|---|---|---|
| CN | 1577195 A | 2/2005 |
| JP | 4-223506 | 8/1992 |
| JP | 2000-305612 | 11/2000 |
| JP | 2003-288107 | 10/2003 |
| JP | 2004-334914 | 11/2004 |

OTHER PUBLICATIONS

Japanese Notice of Reasons for Rejection mailed Jul. 15, 2008 issued in Japanese Application No. 2007-000691 (including a partial translation thereof).
Chinese Office Action issued Jun. 26, 2009 issued in Chinese Application No. 2008100020029 (including a translation thereof).

* cited by examiner

*Primary Examiner*—Bentsu Ro
*Assistant Examiner*—Thai Dinh
(74) *Attorney, Agent, or Firm*—Drinker Biddle & Reath LLP

(57) ABSTRACT

A conveyer for transporting a box and a conveyer for transporting a bottle are driven along a follow-up target axis and a follow-up axis, respectively. The follow-up axis is accelerated from a synchronization start position, and, when the follow-up axis velocity catches up with the conveyer, performs the constant velocity operation. An advanced operation, performed by an asynchronous axis (moving the bottle closer to the box), is started before synchronization completes, and is completed when synchronization completes, then immediately an operation by a synchronous axis (follow-up target axis or follow-up axis) is started (insertion operation). The point of time when the advanced operation is started is determined by processing of the numerical controller, as a point of time when the time required for the follow-up axis in the current status to reach the synchronization completion status becomes the same as the time required for the advanced operation (preset).

4 Claims, 4 Drawing Sheets

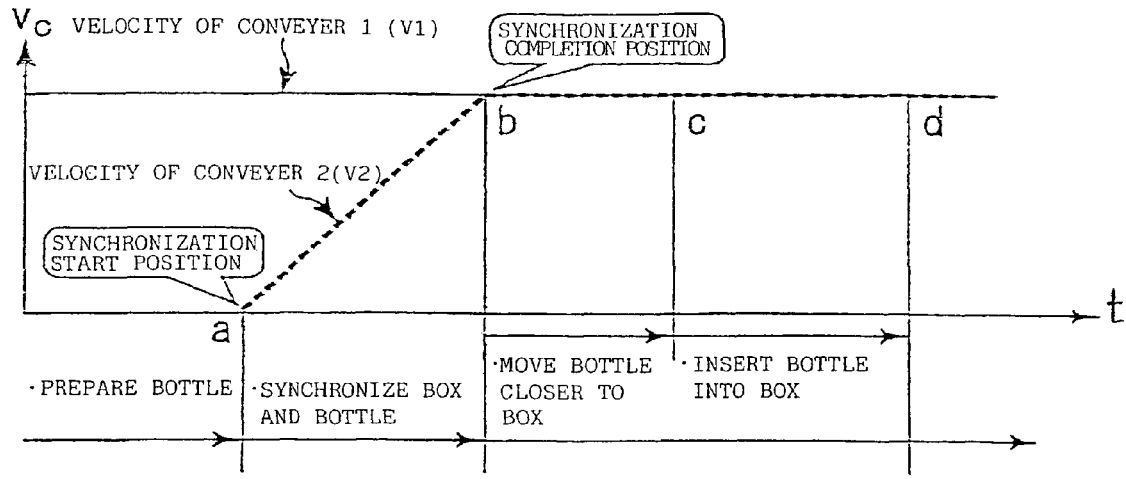
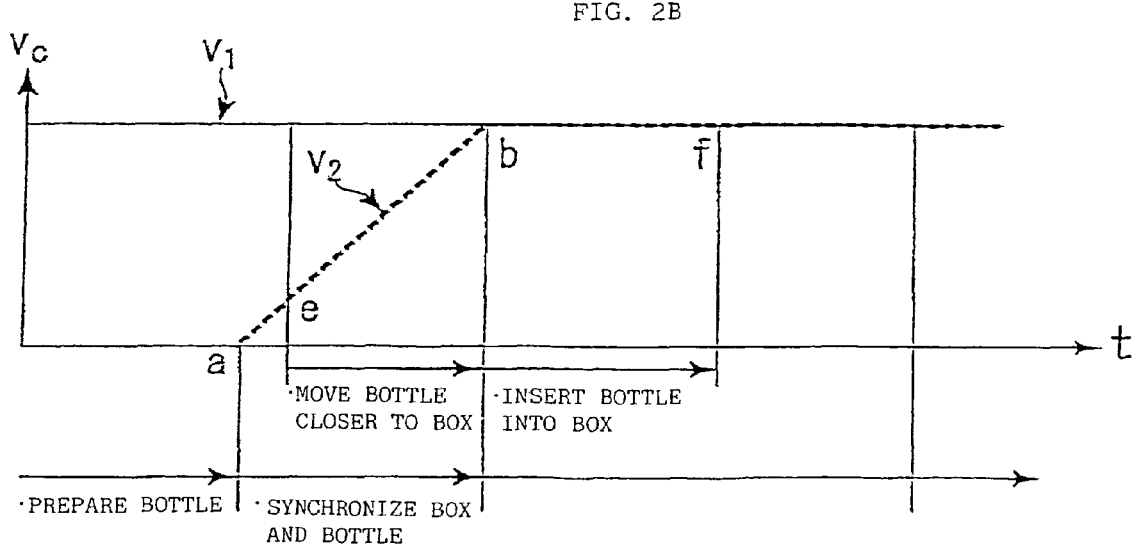

NUMERICAL CONTROLLER AND SYNCHRONOUS CONTROL METHOD USING NUMERICAL CONTROLLER

BACKGROUND OF THE INVENTION

1. Field of the Invention

The present invention relates to a numerical controller which controls a plurality of axes, including an axis to be a follow-up target axis in synchronization and an axis to be a follow-up axis in synchronization, and a control method for performing synchronous control using the numerical controller so that the follow-up axis follows up the follow-up target axis.

2. Description of the Related Art

In an application for moving a tool in stopping status and processing a work which is moving by a conveyer driven by an axis, for example, synchronous control is performed by synchronizing a drive axis (follow-up axis) of moving means (e.g. slider) of a tool with an axis (follow-up target axis) for driving the conveyer.

In this case, actual processing by the tool is started after the synchronization completes (after the moving speed of the tool by the follow-up axis catches up with and matches with the moving speed of the work by the follow-up target axis), but in many cases the positioning of the tool for preparation to start the processing, such as moving the tool closer to the work in a direction perpendicular to the moving direction of the conveyer (hereinafter referred to as "advanced operation"), is required.

Such a preparation operation does not require the synchronization of axes, and need not be performed in a status where the synchronization of the follow-up axis and the follow-up target axis has completed, but in a conventional process, the preparation operation waits until the tool on the follow-up axis synchronizes with the work on the follow-up target axis (moving at a same speed in a prescribed direction), then (after the synchronization completes), the preparation operation is performed, and the processing is executed using the tool on the follow-up axis.

In other words, conventionally the operations of an object (the tool, in the case of the above example) on the follow-up axis can be separated into an operation not related to synchronization and an operation related to synchronization (processing by the tool, in the case of the above example), and even if "an operation not related to synchronization (advanced operation before processing, in the case of the above example)", which is supposed to be executed before operations related to synchronization, exists, no information on time required to enter synchronization status (time which elapses from the start to synchronization to the completion of synchronization) is available, so processing for operations not related to synchronization (processing for advanced operation which is not related to synchronization) is executed after completion of synchronization (after synchronization status is established) (see Japanese Patent Application Laid-Open No. 4-223506).

This means that time required for processing for the advanced operation, which is not related to synchronization, and the execution of an operation based on this processing elapses after completion of synchronization and processing for operation, which is related to synchronization and execution of an operation based on this processing delays accordingly. This generates a kind of loss time, and interferes with a decrease in the cycle time in an application which performs synchronous control.

SUMMARY OF THE INVENTION

It is an object of the present invention to provide: a numerical controller which solves the above mentioned problem in a synchronous control for making a follow-up axis catch up with a follow-up target axis for synchronization, that is, a problem of loss time which is generated because the advanced operation not related to the synchronization and the processing for this operation are executed after completion of synchronization, and can decrease the cycle time in a application which performs synchronous control; and a control method using this device.

The present invention acquires time information that is required, from the start of operation to synchronize the follow-up axis with the follow-up target axis (synchronization start) to the synchronization completion (the follow-up axis catches up with the follow-up target axis, and synchronization status is established), to solve the above problem. Specifically, the numerical controller according to the present invention is a numerical controller for controlling a plurality of axes, including a first axis and a second axis, comprising: synchronous control means which controls the synchronization of the first axis and the second axis, where the first axis is a follow-up target axis and the second axis is a follow-up axis.

This numerical controller further comprises: first detection means for detecting a velocity and current position of the first axis; first time-calculation means for calculating a first time required for the first axis in a current position to reach a synchronization start position; second detection means for detecting a velocity and current position of the second axis; second time-calculation means for calculating a second time required for the second axis in the synchronization start position to reach a synchronization completion position, based on the velocity of the second axis, the current position of the second axis, a target velocity that is a velocity which the second axis is required to have at synchronization completion, and acceleration which is set for the second axis; and estimation means for estimating time required for the second axis to reach synchronization completion by adding the calculation results of the first time-calculation means and the second time-calculation means.

If a third axis, which is an asynchronous axis, is included in the plurality of axes, the numerical controller can have means for outputting a signal for starting control of the third axis at a time point when the second time becomes a time specified in advance. Means for outputting the second time to the outside may be provided.

The present invention also provides a control method for controlling a first axis to follow-up a second axis for synchronization using a numerical controller which controls a plurality of axes including the first axis, which becomes a follow-up target axis in synchronization, and the second axis, which becomes a follow-up axis in synchronization. This control method comprises: a step of detecting a velocity and current position of the first axis; a step of calculating a first time required for the first axis in a current position to reach a synchronization start position; a step of calculating a second time required for the second axis in the synchronization start position to reach synchronization completion, based on the synchronization start position of the second axis, a target velocity, that is, a velocity which the second axis is required to have at completion of synchronization, and acceleration which is set for the second axis; and a step of adding the calculated first time and second time and estimating the time required for the second axis to reach synchronization completion based on the addition result.

According to the present invention, the time information, from the start of operation for the follow-up axis to synchronize with the follow-up target axis (synchronization start) to synchronization completion (the follow-up axis catches up with the follow-up target axis, and synchronization status is established), can be acquired. If this time and the processing time for advanced operation not related to synchronization (operation which is executed prior to the operation executed before synchronization completion) are known, the processing of the advanced operation can be started when the time required for establishing the synchronization status (note that this time gradually decreases after synchronization starts, and becomes zero when synchronization completes) becomes the time required for processing an operation not related to synchronization, so that the processing completion point of advanced operation matches the synchronization completion point.

Hence the processing of an operation which is executed in synchronized status and an operation based on this processing can be started immediately after the advanced operation. In other words, loss time, which is generated because the advanced operation not related to synchronization and processing for this operation are executed after synchronization completion, can be decreased, and cycle time in an application which performs synchronous control can be easily decreased.

BRIEF DESCRIPTION OF THE DRAWINGS

The above and other objects and characteristics of the present invention shall be clarified by the following description of embodiments with reference to the accompanying drawings. In these drawings:

FIG. 2A is a time chart depicting a case of synchronous control according to a prior art using the example shown in FIG. 1;

FIG. 2B is a time chart depicting a case of synchronous control according to the present invention using the example shown in FIG. 1;

DESCRIPTION OF THE PREFERRED EMBODIMENTS

Figure 1:
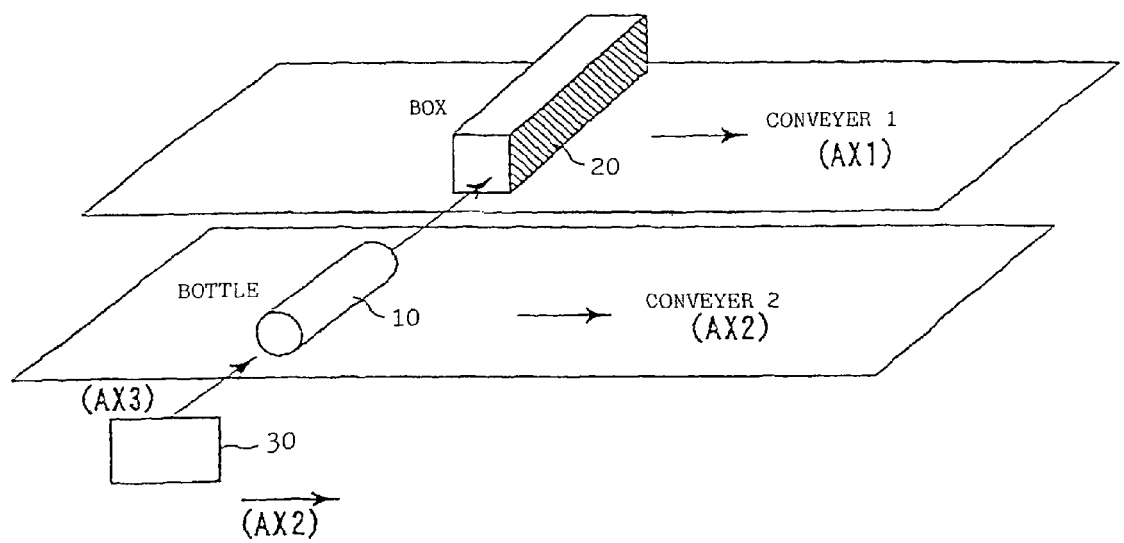
FIG. 1 is a diagram depicting an example of an application which performs synchronous control according to an embodiment of the present invention.

FIG. 1 shows an example of an application where the present invention is applied to synchronous control for a follow-up axis to catch up with and synchronize with a follow-up target axis. As FIG. 1 shows, this application is for performing an operation of inserting a bottle 10 (an example of an object to be moved with a moving object at the same velocity) into a box (an example of the moving object) 2 which is moving by a conveyer 1, using the operation of two synchronizing axes AX1 and AX2, and an asynchronous axis AX3.

A first axis AX1 is an axis for moving the conveyer 1 from the left to the right direction in FIG. 1, and becomes a "follow-up target axis" from the synchronization start point to the clearing of the synchronization status (hereinafter referred to as "during synchronization"). A second axis AX2, on the other hand, is an axis for moving a conveyer 2 in a same direction as the conveyer 1, and becomes "follow-up axis" during synchronization. The box 20 has an opening on the side facing the conveyer 2, so that the bottle 10 is inserted.

The conveyer 1, driven by the first axis AX1, is moved at a constant velocity except during acceleration for startup and deceleration for stopping, and the box 20 is supplied onto the conveyer 1, one at a time with a prescribed time interval, in the orientation shown in FIG. 1 (orientation perpendicular to the conveyer moving direction with the opening facing the conveyer 2 side). An illustration of a mechanism for supplying the box is omitted.

The conveyer 2, which is driven by the second axis AX2, on the other hand, is accelerated after startup from still status (synchronization start status) to moving velocity v1 of the conveyer 1. After reaching the moving velocity v1 (synchronization completion point), the synchronized status is sustained for a predetermined time, then the conveyer 2 decelerates and stops, and stands by for the next startup. The bottle 10 is supplied to a predetermined position on the conveyer 1 (at a predetermined position with respect to the moving direction of the conveyers 1 and 2 and in a direction perpendicular to this direction) in the predetermined orientation as illustrated (orientation suitable for inserting the bottle 10 into the opening of the box 20; the longitudinal direction of the bottle 10 is perpendicular to the moving direction of the conveyers 1 and 2), one at a time when the conveyer 2 is in still status (each time the conveyer 2 stops).

The timing of synchronization start (start of the conveyer 2) is determined such that the bottle 10 and the box 20 come to the same position with respect to the moving direction of the conveyers 1 and 2 (a status where the tip of the bottle 10 exists in front of the opening of the box 20). Here if it is assumed that the velocity of the conveyer 2 simply accelerates to v1 at a constant rate, then the positional relationship of the bottle 10 and the box 20 to which the bottle 10 is inserted is that the box 20 is behind (left side in FIG. 1) at a synchronization start point, gradually approaching the bottle 10 while the conveyer 2 is accelerating, and the bottle 10 and the box 20 are aligned at positions in the moving direction of the conveyers 1 and 2 when the acceleration completes (point of time when movement changed to movement at constant speed v1: that is, the synchronization completion point) (a point where the tip of the bottle 10 exists in front of the opening of the box 20).

Since the synchronization of the axis AX1 (follow-up target axis) and the axis AX2 (follow-up axis) itself, including to a method for correctly determining the synchronization start timing, is part of a known technique, details are omitted, but the synchronization start timing can be easily calculated if the point of time, when the box 20 passed a known predetermined position, is known, using a visual sensor, for example. If the acceleration of the conveyer 2 is a constant value $\alpha 1$, then $v1/\alpha 1$ becomes the "time elapsed from the synchronization start point to the synchronization completion point", and the moving distance D1 of the conveyer 1 and the moving distance D2 of the conveyer 2 during this time are given by the following Expressions (1) and (2).

$$D1 = v1 \times (v1/\alpha 1) \tag{1}$$

$$D2 = (\tfrac{1}{2}) \times \alpha 1 (v1/\alpha 1)^2 \tag{2}$$

If the point of time, when the box 20 comes behind (left side in FIG. 1) the bottle 10 by D3 (D3=D1−D2), is determined based on the detection result of the visual sensor, then the result of this becomes the synchronization start point (start point of conveyer 2).

The operation to insert the bottle 10 into the box 20 is performed in a status where synchronization is completed by the above mentioned synchronization control, and the bottle 10 and the box 20 are aligned and synchronously moving, but an advanced operation of "moving the bottle 10 closer to the box 20" is performed before the bottle 10 actually starts to be inserted (the tip of the bottle 10 enters into the box 20). For this advanced operation and subsequent insertion operation, an approaching/insertion means 30 driven by a third axis AX3 is used.

Various modes are possible for the approaching/insertion means 30. For example, a push plate, which is wide in the moving direction of the conveyers 1 and 2 and which covers, with a margin, the range where the approaching operation and insertion operation are performed, is moved in the approaching/insertion direction (perpendicular to the moving direction of the conveyers 1 and 2) using the axis AX3. The moving distance of the push plate required for the approaching operation and insertion operation can be stored in a memory in a controller (a numerical controller for controlling the three axes: AX1, AX2 and AX3, see FIG. 3) in advance. As (AX2) in FIG. 1 shows, the approaching/insertion means 30 may be placed on the conveyer 2 and moved in a status aligned to the bottle 10.

All steps, including this advanced operation (approaching operation), can be summarized in the following [1] to [5].

[1] The bottle is prepared. (The bottle 10 is placed in a predetermined position on the conveyer 2 in still status in a predetermined orientation.)

[2] The conveyer 2 is started (synchronization start), accelerated and synchronized (shifted to constant velocity moving after synchronization completion).

[3] The bottle 10 is moved closer to the box 20 (advanced operation using the axis AX3).

[4] The bottle 10 is inserted into the box 20 (insertion operation using the axis AX3).

[5] The conveyer 2 is decelerated and stopped after insertion is completed. (Prepare for [1] of the next cycle.)

The problem here is the operation of making the bottle 10 closer to the box 20 in [3]. This approaching operation is not directly related to the synchronization of the axis AX1 and the axis AX2, but is performed after synchronization completion in [2] in prior art. FIG. 2A is a time chart for describing this operation, and as mentioned above, v1 is a moving velocity (constant velocity) of the conveyer 1, and v2 is a moving velocity (variable velocity) of the conveyer 2. The ordinate indicates the conveyer velocity vc, and the abscissa is a time axis. The meaning of symbols a to d are as follows.

a: synchronization start point (start point of the conveyer 2)

b: synchronization completion point (approaching operation start point)

c: approaching operation completion point (insertion operation start point)

d: insertion operation completion point

As FIG. 2A shows, in the prior art, the approaching operation is performed immediately after synchronization completion point b, and the insertion operation is started after reaching the approaching operation completion point c. In the present embodiment, the time between b and c is regarded as a kind of loss time, and control to decrease or eliminate this loss time is performed. For this, the operation to move the bottle 10 closer to the box 20 in [3] is performed when the synchronization in [2] is being performed.

FIG. 2B is a time chart depicting this operation, and just like FIG. 2A, v1 is a moving velocity (constant velocity) of the conveyer 1, v2 is a moving velocity (variable) of the conveyer 2, the ordinate indicates the conveyer velocity vc, and the abscissa is a time axis. The meaning of the symbols a, b, e and f are as follows.

a: synchronization start point (start point of the conveyer 2)

b: synchronization completion point (approaching operation start point)

e: approaching operation start point f: insertion operation completion point

As the comparison of FIG. 2A and FIG. 2B shows, in the present embodiment, the insertion operation can be started immediately after the synchronization completion point b. This is because the advanced operation, which is not related to synchronization (approaching operation in this case), is completed by the synchronization completion point b. In actual operation however, it is strongly desired that the operation of moving the bottle 10 closer to the box 20 and the operation of inserting the bottle 10 into the box 20 are performed continuously. In other words, if the approaching operation is started up too soon, the bottle 10 cannot be inserted into the box 20 smoothly.

If the approaching operation is start up too late, on the other hand, the effect to decrease the cycle time is diminished. Therefore the point of time e is determined by calculating backward from the time required for the approaching operation in [3], that is, the point of time e is determined before the point of time b by this time required for the approaching operation, then the best result is acquired. In an actual application, there are many cases when the time required for "advanced operation not related to synchronization" can be set to "fixed time", including the case of this example of approaching operation, and such cases are considered in the present embodiment. In the case of FIG. 2B, point of time e is determined so that the elapsed time between point of time e and point of time b matches the "time required for operation to move the bottle closer to the box" (a known value is set and stored in the numerical controller).

Calculation for this is performed by software processing in the numerical controller for controlling the axes AX1 to AX3. An example of this calculation content is shown below. The key point of this calculation is to calculate a residual time from the current point to the point when synchronization of the follow-up axis AX2 completes (corresponds to point b in FIG. 2B).

$$T1=(P2-P1)/V1 \qquad (3)$$

$$T2=(V3-V2)/A1 \qquad (4)$$

$$T=T1+T2=(P2-P1)/V1+(V3-V2)/A1 \qquad (5)$$

The meaning of the symbols used here is as follows.

P1: current position of the follow-up target axis AX1 (command position or actual position)

P2: synchronization start position of the follow-up target axis AX1, which corresponds to point a in FIG. 2B V1: current velocity of the follow-up target axis AX1 (command velocity or actual velocity), which corresponds to v1 in FIG. 2B V2: current velocity of the follow-up axis AX2 (command velocity or actual velocity), which corresponds to v2 in FIG. 2B V3: target velocity of the follow-up axis AX2 (or velocity of axis which the follow-up axis is required to have in synchronization completion status), which corresponds to the velocity of the axis AX2 at which v2=v1 is established in FIG. 2B A1: acceleration of the follow-up axis AX2

T1: time required for the follow-up target axis AX1 in the current position to reach the synchronization start position T2: time required for the follow-up axis AX2 in the synchronization start position to reach synchronization completion, which corresponds to time elapsed from point a to point b in FIG. 2B T: time elapsed from the current point to the point when synchronization of the follow-up axis AX2 completes If the point, when T (remaining time up to synchronization completion), determined by the above calculation, matches the above mentioned fixed time (time required for the advanced operation), is the start point of the advanced operation (which corresponds to point of time e in FIG. 2B), then the completion point of time of the advanced operation (approaching operation in this case) matches the synchronization completion point, so the operation can shift immediately to the operation that must be performed in synchronization status (insertion operation in this case). As a result, the cycle time is decreased.

Figure 3:
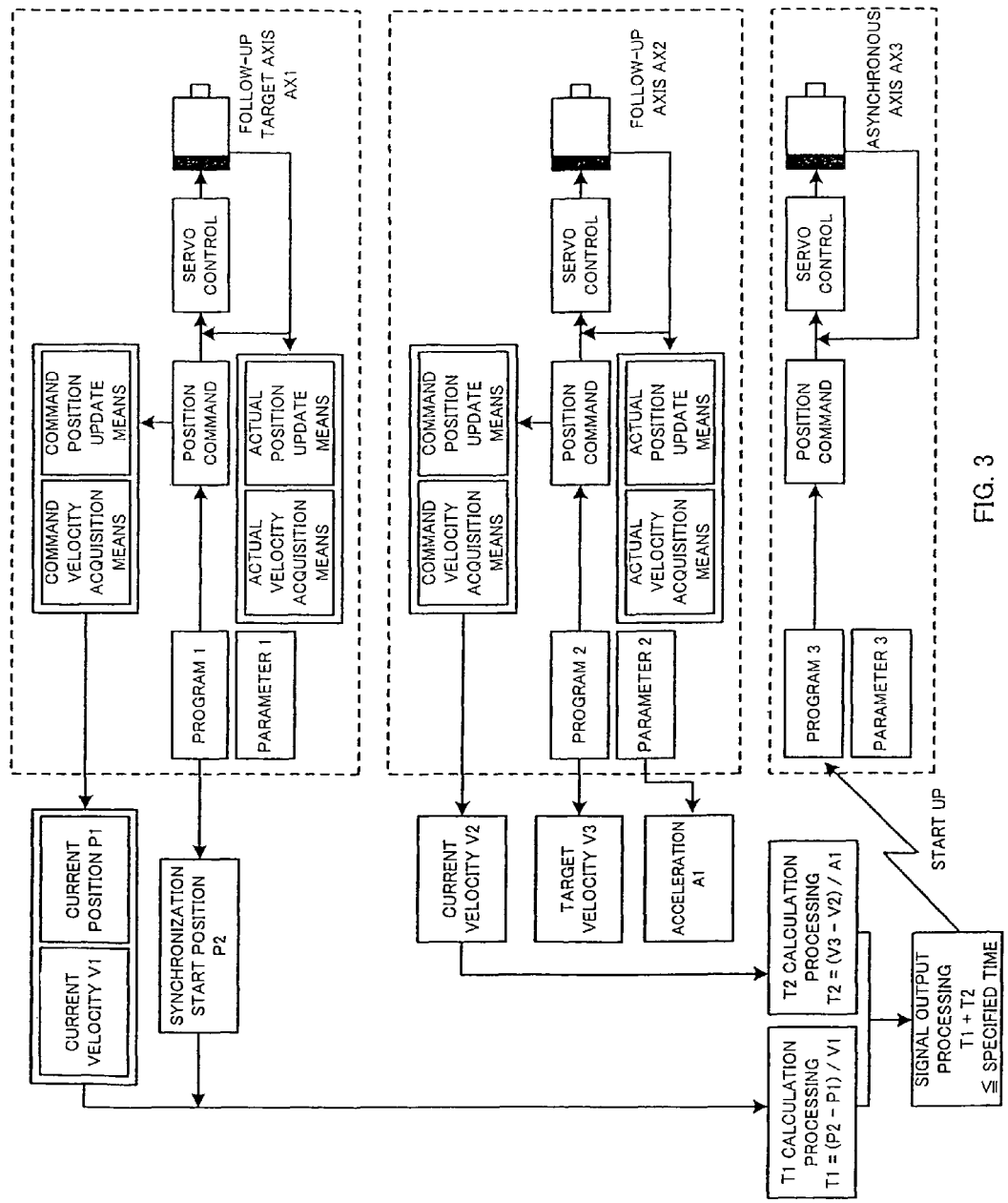
FIG. 3 is a block diagram depicting a configuration of essential parts of a numerical controller used for an embodiment of the present invention.
Figure 4:
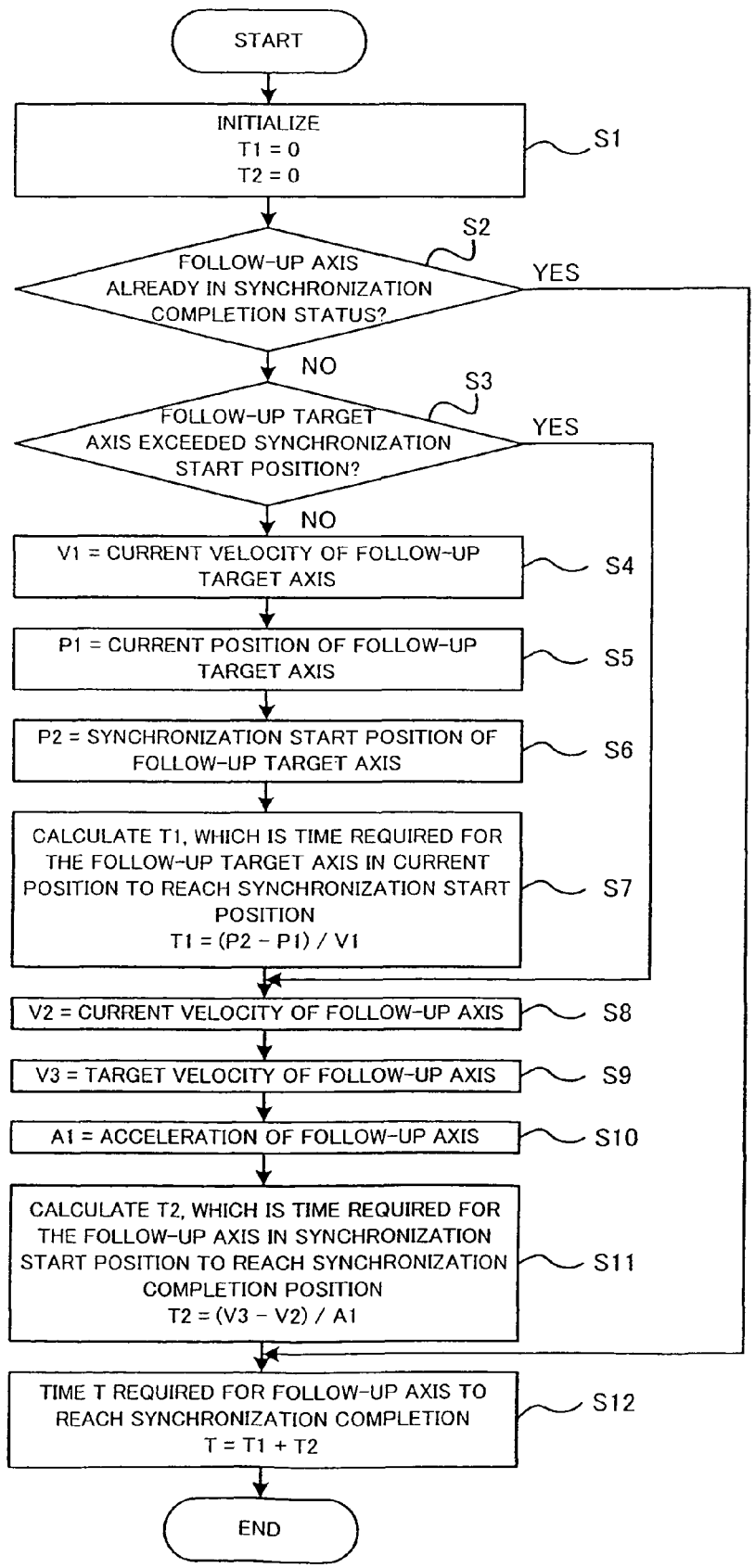
FIG. 4 is a flow chart depicting an overview of processing executed by the CPU of the numerical controller shown in FIG. 3.

FIG. 3 is a block diagram depicting a configuration of the essential parts of the numerical controller, which performs processing including the above mentioned calculation. FIG. 4 is a flow chart depicting an overview of the processing performed by this device.

As FIG. 3 shows, the numerical controller comprises a block for servo-controlling a follow-up target axis AX1, a follow-up axis AX2 and an asynchronous axis AX3. Program 1 is a program for controlling the follow-up target axis AX1, and a parameter 1 is a block (memory) for various parameters which are set according to this program 1. The follow-up axis AX1 is servo-controlled in a known mode based on a position command provided by the program 1. Actual position update means (memory) of the follow-up target axis AX1, on the other hand, acquires a latest actual position of the follow-up target axis AX1 at this point from a known position detector (for the axis AX1), and holds this data (which is updated in the next processing cycle). Based on this data, actual velocity acquisition means of the follow-up target axis AX1 calculates a latest actual velocity, and holds this data (which is updated in the next processing cycle).

Command position update means, on the other hand, holds a latest data of a position command of the axis AX1, and based on this data, command velocity acquisition means acquires a latest data of command velocity (which is specified by program 1). This data is provided to a time T1 calculation processing block as a latest position P1 and latest velocity V1 of the axis AX1. Time T1 is determined by the above mentioned calculation Expression (3).

Program 2 is a program for controlling the follow-up axis AX2, and performs processing for synchronous control by accelerating the follow-up axis AX2 from a still status in the above mentioned mode, so as to catch up with the follow-up target axis AX1. Parameter 2 is a block (memory) for various parameters which are set according to this program 2. The follow-up axis AX2 is servo-controlled in a known mode based on a position command provided by the program 2. Actual position update means (memory) for the follow-up axis AX2, on the other hand, acquires a latest actual position of the follow-up axis AX2 at this point from a known position detector (for axis AX2), and holds the data (which is updated in the next processing cycle). Based on this data, actual velocity acquisition means of the follow-up axis AX2 calculates a latest actual velocity, and holds this data (which is updated in the next processing cycle).

Command position update means for the axis AX2, on the other hand, holds a latest data of a position command of the axis AX2, and based on this data, command velocity acquisition means acquires a latest data of command velocity (specified by program 2). The command velocity data is provided to a time T2 calculation processing block, as a latest command velocity (current velocity) V2 of the axis AX2.

Other data provided to the time T2 calculation processing block is a target velocity V3 and an acceleration value A1 used during acceleration control, which is started at synchronization. The target velocity V3 is specified by program 2, and corresponds to a velocity of the axis AX2 which is required to move the conveyer 2 at the same velocity as the conveyer 1, in the case of the above mentioned example. The acceleration value A1 is preset as a part of parameter 2. The time T2, based on this data, is determined by the above mentioned calculation Expression (4).

The calculation processing for the times T1 and T2 are repeated for each processing cycle (ITP), and the calculation result is sent to a signal output processing block each time. The signal output processing block checks whether or not the values of T1+T2 is smaller than the specified time which is preset, and when T1+T2 become the preset-specified time or less, the signal output processing block immediately outputs a signal to start up a program 3. Program 3 is a program for controlling the asynchronous axis AX3, and parameter 3 is a parameter which is associated with program 3.

"Specified time" here is the above mentioned fixed time required for "advanced operation not related to synchronization", which is performed by the operation of the asynchronous axis (operation for moving the bottle 10 closer to the box 20 in the case of the above example). When program 3 is started up, a position command is created in a known mode based on this program 3, and the asynchronous axis AX3 is controlled via a servo control block. In the case of the above example, the operation of moving the bottle 10 closer to the box 20 and the insertion operation are executed continuously. The completion point of the approaching operation matches the completion point of the synchronization of the axis AX1 and the axis AX2. Therefore the insertion operation is executed smoothly at a specified timing. In the time T2 calculation processing block, a block for outputting the time T2, which is time elapsed for the second axis AX2 in the synchronization start position to reach a synchronization completion position (calculation result), to outside the numerical controller (e.g. display device connected to the numerical controller), may be provided, although this is not illustrated.

The flow chart in FIG. 4 shows an overview of processing which the numerical controller performs using the CPU, based on the above described block configuration and functions. Key points of each step will be described below. In the description of each step, "follow-up target axis" (reference symbol omitted) refers to the follow-up target axis AX1 in FIG. 3, which corresponds to the axis AX1 for driving the conveyer 1 in the example described with reference to FIG. 1 and FIG. 2. "Follow-up axis" (reference symbol omitted) refers to the follow-up axis AX2 in FIG. 3, which corresponds to the axis AX2 for driving the conveyer 2 in the example described with reference to FIG. 1 and FIG. 2. "Asynchronous axis" (reference symbol omitted) refers to the asynchronous axis AX3 in FIG. 3, which corresponds to the axis AX3 for driving the approaching/insertion means 3 in the example described with reference to FIG. 1 and FIG. 2.

Step S1: T1 and T2 are initialized (T1=0, T2=0). T1 and T2 are register values which represent times T1 and T2 respectively.

Step S2: It is checked whether the follow-up axis is already in synchronization completion status or not. This check can be performed by comparing the target velocity (velocity of the follow-up axis at synchronization completion) V3 of the follow-up axis AX2 with the current velocity V2. If the check result is V2=V3 with an error in a predetermined range, judgment is "YES", and processing advances to step S12. If V2<V3, synchronization has not yet been completed, so processing advances to step S3.

Step S3: It is checked whether the follow-up target axis exceeded the synchronization start position or not. The data at the synchronization start position is acquired in the synchronization start position P2 block in FIG. 3, and is calculated by program 2 shown in FIG. 3. The synchronization start position of the follow-up target axis is a determined position of the follow-up target axis at the synchronization start point, whereby the positional relationship between objects, that should be implemented at synchronization completion time (in a status where the bottle 10 and the box 20 are aligned, in the case of the above example), can be implemented, as mentioned above. Description on how to determine this position, which was described above, is omitted, but in the case of the above example, the point when the box 20 comes behind (left side in FIG. 1) the bottle 10 by D3 (which is determined based on the detection result of a visual sensor, for example) is the synchronization start point (start point of conveyer 2), and the position of the follow-up target axis corresponding to this synchronization start point is the "synchronization start point of the follow-up target axis". If the follow-up target axis exceeds the synchronization start position, processing advances to step S8. If not, processing advances to step S4.

Step S4: The current velocity V1 of the follow-up target axis is read. The data on V1 is acquired by the current velocity V1 block shown in FIG. 3 (upper left).

Step S5: The current position P1 of the follow-up target axis is read. The data on P1 is acquired by the current position P1 block shown in FIG. 3 (upper left).

Step S6: The synchronization start position P2 of the follow-up target axis is read. The data on P2 is acquired by the synchronization start position P2 block in FIG. 3, as mentioned above.

Step S7: Time T1 required for the follow-up target axis in the current position to reach the synchronization start position is calculated, and the register value of T1 is updated. T1 is calculated according to the above mentioned Expression (3).

Step S8: The current velocity V2 of the follow-up axis is read. The data on V2 is acquired by the current velocity V2 block shown in FIG. 3.

Step S9: The target velocity V3 of the follow-up axis is read. The data on V3 is acquired by the target velocity V3 block shown in FIG. 3.

Step S10: The acceleration A1 of the follow-up axis is read. The data on A1 is acquired by the acceleration A1 block shown in FIG. 3.

Step S11: The time T2 required for the follow-up axis in the synchronization start position to reach the synchronization completion position is calculated, and the register value of T2 is updated. T2 is calculated according to the above mentioned Expression (4).

Step S12: The time T required for the follow-up axis in the current status to reach the synchronization completion status is calculated. T is calculated according to the above mentioned Expression (5).

The above processing is repeated for each processing cycle, and the time T is determined each time. Naturally the calculated value T gradually becomes smaller. The value T acquired for each calculation is compared with the present specified time in the signal output processing block in FIG. 3, and a signal to start the program 3 is output immediately after T1+T2 becomes a preset specified time or less (if not, stands by until the next value T is input).

As mentioned above, the "specified time" refers to time required for "advanced operation not related to synchronization" (operation to move the bottle 10 closer to the box 20 in the case of the above example). When the program 3 is started, the position command is created in a known mode based on the program 3, and the asynchronous axis AX3 is controlled via the servo control block. In the case of the above example, the operation to move the bottle 10 closer to the box 20 and the insertion operation are executed continuously.

What is claimed is:

1. A numerical controller for controlling a plurality of axes, including a first axis and a second axis, comprising:
    synchronous control means for controlling synchronization of the first axis and the second axis, where the first axis is a follow-up target axis and the second axis is a follow-up axis;
    first detection means for detecting a velocity and current position of the first axis;
    first time-calculation means for calculating a first time required for the first axis in a current position to reach a synchronous start position;
    second detection means for detecting a velocity and current position of the second axis;
    second time-calculation means for calculating a second time required for the second axis in the synchronization start position to reach a synchronization completion position, based on the velocity of the second axis, the current position of the second axis, a target velocity that is a velocity which the second axis is required to have at synchronization completion, and an acceleration which is set for the second axis; and
    estimation means for estimating time required for the second axis to reach synchronization completion by adding calculation results of the first time-calculation means and the second time-calculation means.

2. The numerical controller according to claim 1, wherein the plurality of axes includes a third axis which is an asynchronous axis, and the numerical controller further comprises means for outputting a signal for starting control of the third axis at a time point when the time to reach synchronization completion becomes a time specified by a parameter in advance.

3. The numerical controller according to claim 1, further comprising means for outputting the time required to reach synchronization completion to the outside.

4. A control method for controlling a first axis to follow-up a second axis for synchronization using a numerical controller which controls a plurality of axes including the first axis, which becomes a follow-up target axis in synchronization, and the second axis, which becomes a follow-up axis in synchronization,
    the method comprising steps of:
    detecting a velocity and current position of the first axis;
    calculating a first time required for the first axis in a current position to reach a synchronization start position;
    calculating a second time required for the second axis in the synchronization start position to reach synchronization completion, based on the synchronization start position of the second axis, a target velocity, that is a velocity which the second axis is required to have at synchronization completion, and acceleration which is set for the second axis; and
    adding the calculated first time and second time, and estimating time required for the second axis to reach synchronization completion based on the addition result.

* * * * *